(12) United States Patent
Buskies et al.

(10) Patent No.: US 7,026,499 B2
(45) Date of Patent: Apr. 11, 2006

(54) LINEAR CARBOXY-FUNCTIONAL ORGANOSILOXANYL DERIVATIVES AND THE USE THEREOF FOR THE TREATMENT OF THE SURFACES OF LEATHER

(75) Inventors: Heike Buskies, Essen (DE); Manfred Krakenberg, Essen (DE); Sascha Oestreich, Essen (DE); Stefan Stadtmüller, Essen (DE)

(73) Assignee: Goldschmidt GmbH, Essen (DE)

( * ) Notice: Subject to any disclaimer, the term of this patent is extended or adjusted under 35 U.S.C. 154(b) by 73 days.

(21) Appl. No.: 10/772,166

(22) Filed: Feb. 2, 2004

(65) Prior Publication Data

US 2004/0155220 A1    Aug. 12, 2004

(30) Foreign Application Priority Data

Feb. 4, 2003    (DE) ................. 103 04 330

(51) Int. Cl.
*C07F 7/18*    (2006.01)
*C07F 7/08*    (2006.01)
*C07F 7/02*    (2006.01)

(52) U.S. Cl. ............ 556/440; 556/437; 556/436; 556/450; 556/453

(58) Field of Classification Search ........... 556/440, 556/437, 436, 450, 453
See application file for complete search history.

(56) References Cited

FOREIGN PATENT DOCUMENTS

| EP | 0 324 345 A1 | 7/1989 |
|---|---|---|
| WO | WO 93/22464 | 11/1993 |
| WO | WO 95/22627 | 8/1995 |

*Primary Examiner*—Elvis O. Price
(74) *Attorney, Agent, or Firm*—Frommer Lawrence & Haug LLP

(57) ABSTRACT

The invention relates to linear carboxy-functional organosiloxane compounds of the general formula (I)

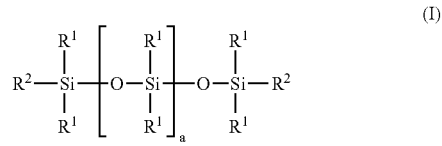

in which
a is from 1 to 200,
$R^1$ are identical or different aliphatic or aromatic hydrocarbon radicals and
$R^2$ is $-(Y)[O(C_2H_{4-b}(R^3)_bO)_c(C_dH_{2d}O)_e]_fX$,
and the use thereof for the treatment of the surface of leather.

15 Claims, No Drawings

LINEAR CARBOXY-FUNCTIONAL ORGANOSILOXANYL DERIVATIVES AND THE USE THEREOF FOR THE TREATMENT OF THE SURFACES OF LEATHER

RELATED APPLICATIONS

This application claims priority to German application Ser. No. 103 04 330.6, filed Feb. 4, 2003, herein incorporated be reference.

BACKGROUND OF THE INVENTION

1. Field of the Invention

The invention relates to novel carboxy-functional organosiloxanyl derivatives and the use thereof for the treatment of the surface of leather.

2. Description of the Related Art

Leather left in the natural state is susceptible to dirt and moisture, owing to its chemical structure and its fibrous composition. As positive as its absorptivity, water absorption capacity and permeability in clothing and footwear with respect to the body's own perspiration may be, this behavior will be assessed negatively under the action of external moisture.

An important precondition for the usability of leather clothing in private and commercial use relates to its waterproof or at least substantially water-repellant properties.

In order to achieve this effect, impregnating agents based on animal, vegetable and synthetic products have already been used in the past.

Owing to their performance characteristics, the synthetic agents have very substantially become established, in particular the polysiloxanes in their various modifications.

Polysiloxanes have a high surface tension with respect to water and, owing to the greatly reduced adhesion to water, enable its cohesive forces to be fully effective, with the effect that the resulting beads and drops are repelled by the surface.

In order to increase the purely mechanical and electro-static (van der Waals) adhesive forces of the polysiloxanes, functional groups, such as, in particular, carboxyl groups, were incorporated in the molecule. Via these groups, the polysiloxane is strongly bonded by chemical bonds to the fibers of the leather.

In comparison with the impregnating agents used therein, a substantial long-term effect could be achieved since the water-repellant protective layer is less easy to remove by scouring, abrasion or other external mechanical stresses.

EP-A-0 745 141 describes a process for waterproofing leather and skins in aqueous emulsions and in the presence of emulsifiers with polysiloxanes carboxy-functionalized in a comb-like manner, in which the carboxyl groups are bonded to the polymer main chain via spacer groups in the form of linear or branched $C_2$–$C_{40}$-alkylene groups which likewise may contain hetero atoms or hetero groups.

EP-A-0 324 345 describes a process for waterproofing leather, skins and leather substitutes, according to which polysiloxanes which preferably have terminal carboxyl groups and whose carboxyl groups are present in neutralized form are used.

WO-A-93/22464 describes a process for waterproofing leather, skins and leather substitutes using sulfosuccinic esters prepared from polyols and maleic anhydride and sulfites as water repellants, according to which alpha-/omega-OH-functional polysiloxanes can also be used as polyols.

The water repellant effect of these compounds is, however, furthermore in need of improvement with respect to water repellency, flexibility, abrasion resistance and resistance to extreme external stresses, as occur in particular in the case of work clothing or protective clothing used in industrial or military applications or the footwear used there.

OBJECTS OF THE INVENTION

It was therefore an object of the present invention to provide water repellants for leather which have improved performance characteristics under severe external stresses.

It is further object of this invention to make apparel leather water repellant with full elasticity and softness. In the treatment, instead of a thin film being applied over the leather surface, the water repellant penetrates into the leather and surrounds the leather fibers, which thus: remain breathable.

These objects and others, which will become apparent from the Description of the Invention are achieved by using linear carboxy-functional organosiloxane compounds.

DESCRIPTION OF THE INVENTION

The invention therefore relates to linear carboxy-functional organosiloxane compounds of the general formula (I)

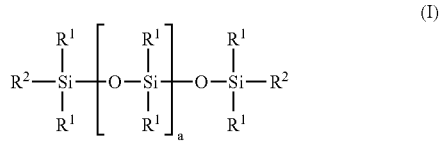

(I)

in which
a is from 1 to 200, preferably 10 to 150
$R^1$ are identical or different aliphatic or aromatic hydrocarbon radicals,
$R^2$ is —(Y)[O($C_2H_{4-b}(R^3)_b$O)$_c$($C_dH_{2d}$O)$_e$]$_f$X,
where
Y is an (f+1)-valent, optionally branched hydrocarbon radical having 3 to 12 C atoms,
b is from 1 to 3,
c is from 0 to 20,
d is from 2 to 4,
e is from 0 to 20,
f is from 1 to 4,
$R^3$ is $R^1$,
X is C(O)-Z-$CO_2$H and
Z is a divalent hydrocarbon radical selected from the group consisting of

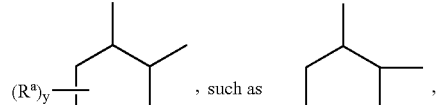

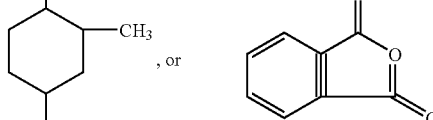

where
g is from 1 to 12;
$R^a$ is alkyl, especially $C_1$–$C_4$ alkyl and most especially —$CH_3$; and
y is 0 to 4.

Especially preferred are compounds wherein $R^a$ is methyl and y is 1, or those compounds where y is 0; i.e., those compounds wherein the cyclohexyl ring is unsubstituted (no $R^a$ group).

The invention furthermore relates to the use of linear carboxy-functional organosiloxane compounds of the general formula (I) for the treatment of the surface of leather.

Preferred linear carboxy-functional organopolysiloxanes are those wherein $R^1$ is a $C_1$–$C_6$ hydrocarbyl group, with alkyl such as methyl and ethyl being more preferred, or is a $C_6$ to $C_{12}$ aromatic group such as phenyl. Especially preferred groups for $R^1$ are H and/or methyl. Other preferred linear carboxy-functional organopolysiloxanes wherein a has a value from 10 to 2000 or $R^2$ is a polyether radical comprising mixed blocks.

A person skilled in the art is familiar with the fact that, the compounds are present in the form of a mixture having a distribution substantially regulated by statistical laws. The values for the index a are therefore mean values.

Compounds according to the invention can be prepared in a simple manner by reacting hydroxy-functional siloxanes of the general formula

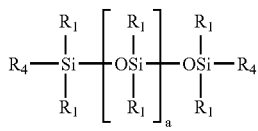

with organic carboxylic anhydrides of the general formula

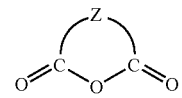

in which
Z is a divalent hydrocarbon radical selected from the group consisting of

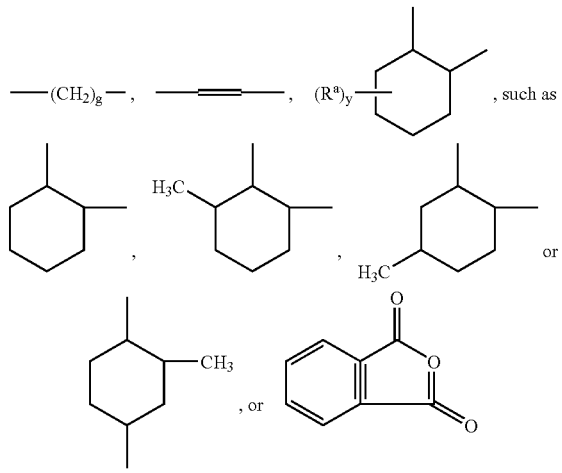

where
g is 1 to 12
$R^a$ is alkyl, especially $C_1$–$C_4$ alkyl; and
y is 0 to 4.

Examples of substances according to the invention are:

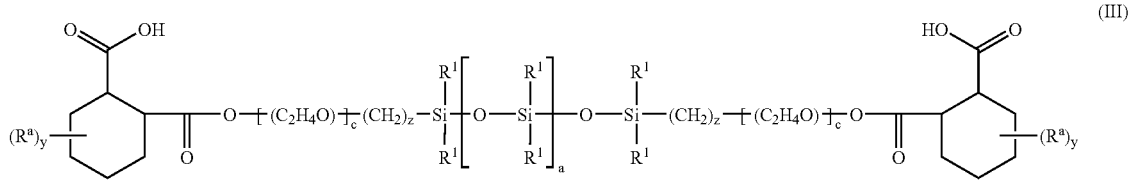

in which
a is from 1 to 200,
$R^1$ are identical or different aliphatic or aromatic hydrocarbon radicals,
$R^4$ is —$(Y)[O(C_2H_{4-b}(R^3)_bO)_c(C_dH_{2d}O)_e]_fH$,
where
Y is an (f+1)-valent, optionally branched hydrocarbon radical having 3 to 12 C atoms,
b is from 1 to 3,
c is from 0 to 20,
d is from 2 to 4,
e is from 0 to 20 and
f is from 1 to 4, in which $R^a$ may be identical or different and are H or a $C_1$–$C_4$-alkyl radical y is 1 to 4 and z is 3 to 12. Especially preferred are those substances where $R^a$ is methyl and d is 1.

| Compound | a | b | c | $R^1$ | y |
|---|---|---|---|---|---|
| 1 | 10 | 6 | 0 | Me | 0 |
| 2 | 20 | 6 | 0 | Me | 0 |
| 3 | 30 | 6 | 0 | Me | 0 |
| 4 | 70 | 6 | 0 | Me | 0 |
| 5 | 20 | 3 | 0 | Me | 0 |
| 6 | 30 | 3 | 0 | Me | 0 |
| 7 | 30 | 3 | 0 | Me | 0 |
| 8 | 30 | 6 | 4 | Me | 0 |

The following synthesis examples serve as non-limiting examples which explain the invention.

EXAMPLE 1

Addition reaction of hexahydrophthalic anhydride with a linear hydroxy-functional siloxane:

In a three-necked flask equipped with a coil condenser, thermometer and dropping funnel and a nitrogen connection, 92 g of hexahydrophthalic anhydride and 908 g of a linear hydroxy-functional siloxane of the general formula (II):

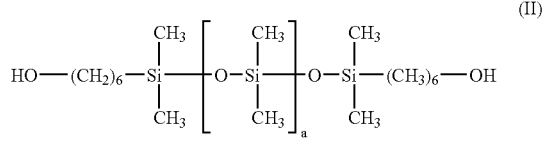

having a hydroxyl number of 45 mg KOH/g (i.e. a is 29) and a viscosity of 85 mPa.s were mixed in a nitrogen atmosphere. The solution was heated to 120° C. and stirred at this temperature for 6 hours. After cooling to room temperature, the product was filtered. A clear, liquid product having an acid number of 40 mg KOH/g and a viscosity of 550 mPa.s was obtained.

According to $^{29}$Si-NMR and $^{13}$C-NMR spectroscopic results, the end product has the following structure (III):

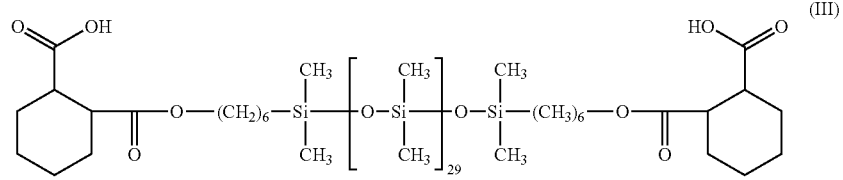

EXAMPLE 2

Addition reaction of hexahydrophthalic anhydride with a linear hydroxy-functional siloxane:

In a three-necked flask equipped with a coil condenser, thermometer and dropping funnel and a nitrogen connection, 226.3 g of hexahydrophthalic anhydride and 773.7 g of a linear hydroxy-functional siloxane of the general formula (II) having a hydroxyl number of 130 mg KOH/g (i.e. a is 17) and a viscosity of 70 mPa.s were mixed in a nitrogen atmosphere. The solution was heated to 120° C. and stirred at this temperature for 6 hours. After cooling to room temperature, the product was filtered. A clear, liquid product having an acid number of 115 mg KOH/g and a viscosity of 270 mPa.s was obtained.

According to $^{29}$Si-NMR and $^{13}$C-NMR spectroscopic results, the end product has the following structure (IV).

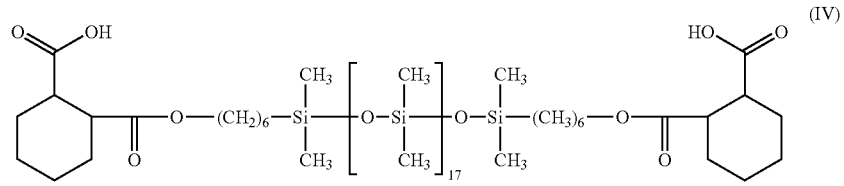

EXAMPLE 3

Addition reaction of hexahydrophthalic anhydride with a linear hydroxy-functional siloxane:

In a three-necked flask equipped with a coil condenser, thermometer and dropping funnel and a nitrogen connection, 48.5 g of hexahydrophthalic anhydride and 951.5 g of a linear hydroxy-functional siloxane of the general formula (II) having a hydroxyl number of 17 mg KOH/g (i.e. a is 84) and a viscosity of 155 mPa.s were mixed in a nitrogen atmosphere. The solution was heated to 120° C. and stirred at this temperature for 6 hours. After cooling to room temperature, the product was filtered. A clear, liquid product having an acid number of 16 mg KOH/g and a viscosity of 610 mPa.s was obtained.

According to $^{29}$Si-NMR and $^{13}$C-NMR spectroscopic results, the end product has the folowing structure (V).

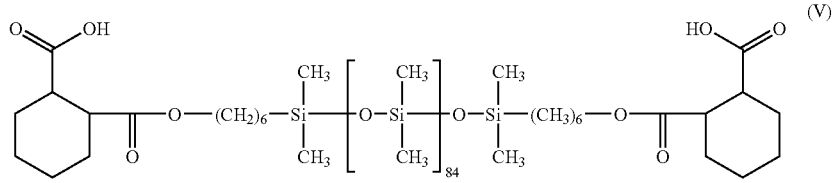

For use as an additive, the carboxy-functional polysiloxanes according to the invention are incorporated in an amount by weight of between about 0.01 and about 20% into an aqueous or solvent-containing formulation. The use of carboxy-functional polysiloxanes according to the invention can be effected in solution or as an emulsion. Further components of the formulation, in addition to the solvent and carboxy-functional polysiloxane in the formulation, may be, for example, emulsifiers, liquid paraffins and mineral oils.

With the use of the carboxy-functional polysiloxanes according to the invention, an outstanding water repellant effect is achieved in combination with an improvement in the quality of handle. This is permitted by the particular structural principle of the carboxy-functional polysiloxanes according to the invention. The long uninterrupted siloxane chain is responsible for the characteristic properties as a leather treatment agent. The choice of the organic units at the chain ends results in advantageous dissolution and emulsification properties for use from aqueous or solvent-containing formulations, the carboxyl groups being capable of interacting with the positively charged centers on the surface of the leather.

Comparison of Performance Characteristics:

Leather water repellants are ideally applied from aqueous formulations (from 5 to 30%) using emulsifiers and standardized conditions, such as temperature and pH.

For the determination of the water repellant effect, 5% solutions of the compounds according to the invention (examples 1 to 3) in petroleum ether were prepared. Leather pieces measuring 6×6 cm are introduced for 2 hours into a screw-cap bottle which was filled with 300 ml of the above solution. After the reaction time, each leather piece was dried at 50° C. and weighed. The impregnated leather piece was then stored in 300 ml of water for 60 min. The water absorption was determined by weighing after removal of adhering water drops:

The weight difference caused by the water absorption is stated in %, based on the dry impregnated leather.

The results are shown in the following table 1:

TABLE 1

| Additive | Final weight II (%) |
|---|---|
| Comparative sample, untreated | 96 |
| 1 | 63 |
| 3 | 56 |
| 4 | 32 |
| 8 | 64 |

As is evident, the water absorptivity of leather after the treatment with the linear carboxy-functional organosiloxanyl derivative according to the invention is substantially reduced.

The above description of the invention is intended to be illustrative and not limiting. Various changes or modifications in the embodiments described herein may occur to those skilled in the art. The changes can be made without departing from the scope or spirit of the invention.

The invention claimed is:

1. A linear carboxy-functional organosiloxane compound of the general formula (I)

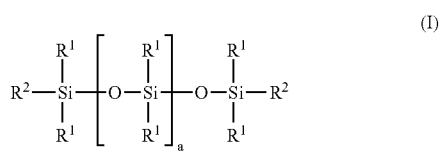

in which
a is from 1 to 200,
$R^1$ are identical or different aliphatic or aromatic hydrocarbon radicals,
$R^2$ is $—(Y)[O(C_2H_{4-b}(R^3)_bO)_c(C_dH_{2d}O)_e]_fX$,
where
Y is an (f+1)-valent, optionally branched hydrocarbon radical having 3 to 12 C atoms,
b is from 1 to 3,
c is from 0 to 20,
d is from 2 to 4,
e is from 0 to 20,
f is from 1 to 4,
$R^3$ is $R^1$,
X is $C(O)$-Z-$CO_2H$ and
Z is a divalent hydrocarbon radical selected from the group consisting of

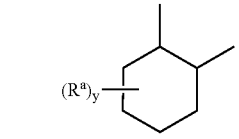 and 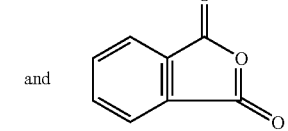

where
g is from 1 to 12;
$R^a$ is alkyl; and
y is 0 to 4.

2. The linear carboxy-functional organosiloxane as claimed in claim 1, wherein the radical $R^2$ is a polyether radical comprising mixed blocks.

3. The linear carboxy-functional organosiloxanes a claimed in claim 1, wherein $R^1$ is a $C_1$–$C_5$ aliphatic hydrocarbyl group or a $C_6$ to $C_{12}$ aromatic group.

4. The linear carboxy-functional organosiloxane as claimed in claim 1, wherein $R^1$ is H and/or methyl.

5. The linear carboxy-functional organosiloxane as claimed in claim 1, wherein a has a value of from 10 to 150.

6. The linear carboxy-functional organosiloxane as claimed in claim 1, wherein z is

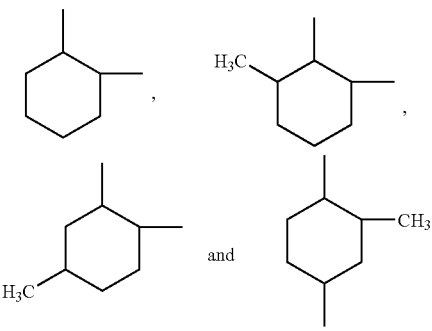

7. The linear carboxy-functional organosiloxane as claimed in claim 1 which has the formula

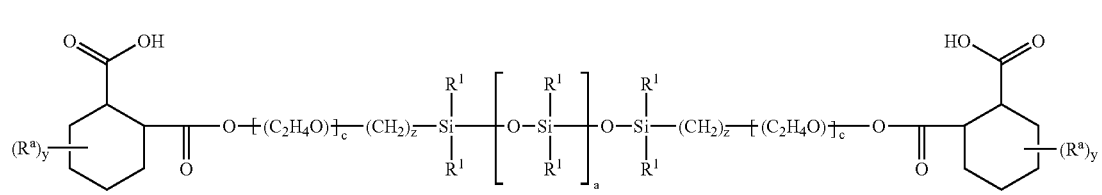

wherein
$R^a$ is identical or different and is a $C_1$–$C_4$-alkyl radical,
$R^1$ is methyl;
a is from 1 to 150;
z is 3 to 12;
c is from 0 to 4; and
y is from 0 to 4.

8. The linear carboxy-functional organosiloxane as claimed in claim 7 wherein $R^a$ is methyl and y is 1.

9. The linear carboxy-functional organosiloxane as claimed in claim 7 wherein
$R^1$ is $CH_3$;
a is from 1 to 150;
z is 3 or 6; and
c is 0 or 4; and
y is 0.

10. A process for the preparation of linear carboxy-functional polysiloxanes as claimed in claim 1, which comprises reacting hydroxy-functional siloxanes of the general formula

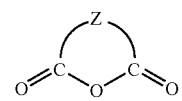

in which
a is from 1 to 200,
$R^1$ are identical or different aliphatic or aromatic hydrocarbon radicals, $R^4$ is $—(Y)[O(C_2H_{4-b}(R^3)_bO)_c(C_dH_{2d}O)_e]_fH$,
where
Y is an (f+1)-valent, optionally branched hydrocarbon radical having 3 to 12 C atoms,
b is from 1 to 3,
c is from 0 to 20,
d is from 2 to 4,
e is from 0 to 20 and
f is from 1 to 4,
with organic carboxylic anhydrides of the general formula $$\overset{Z}{\underset{O}{\overset{}{\underset{}{\diagdown}}}}\overset{}{\underset{}{\diagup}}$$

in which
Z is a divalent hydrocarbon radical selected from the group consisting of $—(CH_2)_g—$, $=\!\!=\!\!=$,

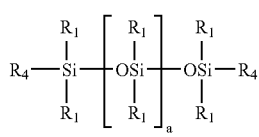

where
g is 1 to 12
$R^a$ is alkyl;
y is 0 to 4.

11. A leather treatment formulation which comprises from about 0.01 to about 50.0% by weight, based upon total weight of the formulation, of at least one linear carboxy-functional polysiloxane as claimed in claim 1, a solvent, and optionally an additive.

12. The leather treatment formulation as claimed in claim 11, wherein the solvent is an aqueous solvent.

13. The leather treatment formulation according to claim 11 wherein the additive is an emulsifier, liquid paraffin or mineral oil.

14. The leather treatment formulation as claimed in claim 11 wherein the amount of carboxy-functional polysiloxane is between about 0.01 to about 20% by weight.

15. A method for providing water repellancy to leather which comprises applying the leather treatment formulation as claimed in claim 11 to the surface of the leather.

* * * * *